(No Model.)
H. BARRETT.
MANUFACTURE OF STOPPERS FOR BOTTLES, JARS, AND LIKE VESSELS.
No. 281,332. Patented July 17, 1883.
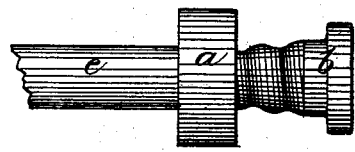
Witnesses.
Chas. R. Abell.
W. Chaffee
Inventor.
Henry Barrett
by John J. Halstead & Son
his Attys.

UNITED STATES PATENT OFFICE.

HENRY BARRETT, OF LONDON, ENGLAND.

MANUFACTURE OF STOPPERS FOR BOTTLES, JARS, AND LIKE VESSELS.

SPECIFICATION forming part of Letters Patent No. 281,332, dated July 17, 1883.

Application filed January 2, 1883. (No model.) Patented in England November 25, 1881, No. 5,154; in Germany January 19, 1882, No. 22,835; in France February 23, 1882, No. 147,499, and in Italy March 31, 1883, XVI, 15,031, XXX, 39.

*To all whom it may concern:*

Be it known that I, HENRY BARRETT, a subject of the Queen of Great Britain, residing at London, England, have invented new and useful Improvements in the Manufacture of Stoppers for Bottles, Jars, and like Vessels, (for which I have obtained Letters Patent in Great Britain, No. 5,154, dated November 25, 1881, and in France, No. 147,499, dated February 23, 1882,) of which the following is a specification.

This invention relates to an improved manufacture of stoppers for bottles, jars, and like vessels, and has special reference to the manufacture of what are known as "screw-stoppers," when such stoppers are made chiefly from a heat-resisting material, such as glass; and the improvements consist in covering or coating or partly covering or coating a glass stopper with vulcanite, xylonite, celluloid, or like material, as hereinafter described, reference being had to the accompanying drawings.

Figure 1 shows one end of a tube inserted, when softened, into a mold or die; Fig. 2, a screw-stopper made of heat-resisting material and ready to be screwed into the softened or somewhat plastic end of the tube; Fig. 3, the stopper and its attaching-casing partly withdrawn from the mold, and Fig. 4 the completed stopper.

In carrying out my invention I take a tube, $e$, of vulcanite, xylonite, celluloid, or like material, and subject one end of the same to heat, so as to render it somewhat plastic, and I then introduce the said softened part of the tube into a mold or die, such as that shown at $a$, Fig. 1, constructed to form the threaded part of the stopper. While the tube is in a plastic state in the die $a$, I screw therein a stopper, such as that shown at $b$, Fig. 2, made of glass or like heat-resisting material, the threaded part of the glass stopper being constructed of such a size that it will force the plastic vulcanite tubing to take the shape of the die or mold $a$. As the tubing cools it contracts tightly on the glass stopper, which, with the casing attached, is then screwed out of the mold, as shown in Fig. 3, and the tube $e$ is cut off to the required length and the stopper trimmed in any suitable manner. Fig. 4 is an elevation of the complete stopper; or I sometimes take a tube of vulcanite, and, having softened it by heat, I then screw therein a stopper of glass or like heat-resisting material, and after the vulcanite has cooled and become shrunk or contracted on the body of the stopper it is inclosed in a contracting mold, which will impart a finish to it.

By this means I obtain a glass stopper with an outer casing or covering of vulcanite or like material suitable to be used for closing a glass screw-necked bottle, as only the vulcanite covering of the stopper will come into contact with the glass of the bottle and the contents of the bottle; and I thus obviate the objection attending the use of glass for stoppers, as when made wholly of such material the stoppers will not work smoothly in glass bottles.

Having thus described the nature of the said invention and the best means with which I am acquainted for carrying the same into effect, I would have it understood that what I claim is—

The manufacture, as herein described, of stoppers for bottles, jars, and like vessels, by screwing a glass screw stopper body into a softened tube of vulcanite, xylonite, celluloid, or like material placed in a suitable die or mold, substantially as hereinbefore described, and represented in Figs. 1, 2, 3, and 4 of the accompanying drawings.

H. BARRETT.

Witnesses:
G. F. REDFERN,
A. ALBUTT.